United States Patent
Koerner et al.

(10) Patent No.: US 9,811,791 B2
(45) Date of Patent: Nov. 7, 2017

(54) PERSONALIZED WORK PLANNING BASED ON SELF-OPTIMIZING ROLE-BASED CROWD-SOURCED INFORMATION

(71) Applicants: Dennis Koerner, Karlsdorf-Neuthard (DE); Andreas Linke, Rauenberg (DE)

(72) Inventors: Dennis Koerner, Karlsdorf-Neuthard (DE); Andreas Linke, Rauenberg (DE)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 14/581,018

(22) Filed: Dec. 23, 2014

(65) Prior Publication Data
US 2016/0180279 A1  Jun. 23, 2016

(51) Int. Cl.
*G06F 3/06* (2006.01)
*G06Q 10/06* (2012.01)
*G06Q 50/00* (2012.01)

(52) U.S. Cl.
CPC ........ *G06Q 10/063114* (2013.01); *G06Q 10/06393* (2013.01); *G06Q 50/01* (2013.01)

(58) Field of Classification Search
CPC ...... G06Q 10/101; G06Q 10/06; G06Q 30/02; G06Q 30/0241; G06Q 30/0277; G06Q 10/063114; G06Q 50/01; G06K 9/6215; G06F 3/067
See application file for complete search history.

(56) References Cited

U.S. PATENT DOCUMENTS

| | | | | |
|---|---|---|---|---|
| 2007/0198317 A1* | 8/2007 | Harthcryde | ............ | G06Q 10/00 705/7.14 |
| 2011/0264645 A1* | 10/2011 | Mital | ............ | G06F 3/0482 707/708 |
| 2012/0284090 A1* | 11/2012 | Marins | ............ | G06Q 10/0631 705/7.39 |
| 2013/0006717 A1* | 1/2013 | Oleson | ............ | G06Q 10/06311 705/7.41 |
| 2013/0204652 A1* | 8/2013 | Marins | ............ | G06Q 30/02 705/7.15 |
| 2013/0304758 A1* | 11/2013 | Gruber | ............ | G06F 17/30976 707/769 |
| 2014/0058801 A1* | 2/2014 | Deodhar | ............ | G06Q 10/0639 705/7.38 |
| 2014/0066044 A1* | 3/2014 | Ramnani | ............ | H04W 8/24 455/418 |
| 2014/0075004 A1* | 3/2014 | Van Dusen | ............ | H04L 41/04 709/223 |
| 2014/0129949 A1* | 5/2014 | Singer | ............ | H04L 67/18 715/733 |

(Continued)

*Primary Examiner* — Tadeese Hailu
(74) *Attorney, Agent, or Firm* — Brake Hughes Bellermann LLP

(57) ABSTRACT

According to a general aspect, a system for personalized planning based on crowd-sourcing includes a data collector configured to collect task-related data specific to a user from multiple different data sources, and a planning optimizer configured to determine a task list providing upcoming tasks to complete based on an analysis of the task-related data in view of role-based task data and task-tracking information. The planning optimizer obtains a task from other users having a same role as the user based on the role-based task data, determines a suggested activity for completing the task based on the task-tracking information, and provides the task list to the user via a user interface.

20 Claims, 5 Drawing Sheets

(56) References Cited

U.S. PATENT DOCUMENTS

| | | | | |
|---|---|---|---|---|
| 2014/0136254 A1* | 5/2014 | Das | G06Q 10/063112 | 705/7.14 |
| 2014/0149513 A1* | 5/2014 | Grennan | G06Q 10/063112 | 709/204 |
| 2014/0278850 A1* | 9/2014 | Boccuzzi, Jr. | G06Q 30/0208 | 705/14.11 |
| 2014/0372160 A1* | 12/2014 | Nath | G06Q 10/06311 | 705/7.13 |
| 2015/0195379 A1* | 7/2015 | Zhang | G06F 17/30905 | 709/219 |
| 2015/0278339 A1* | 10/2015 | Cherukuri | G06F 17/30598 | 707/738 |
| 2016/0011917 A1* | 1/2016 | Lai | G06F 9/54 | 718/100 |
| 2016/0188738 A1* | 6/2016 | Gruber | G06F 17/30976 | 707/722 |
| 2016/0205523 A1* | 7/2016 | Brown | H04W 4/22 | 455/404.1 |

\* cited by examiner

PERSONALIZED WORK PLANNING BASED ON SELF-OPTIMIZING ROLE-BASED CROWD-SOURCED INFORMATION

BACKGROUND

Through the growing complexity of daily work life, the overall picture of what to do next can easily get lost. For example, jobs often have multiple layers of actions and responsibilities such as checking emails, reading through all relevant reporting, manually monitoring all important key performance indicators (KPIs), running simulations on existing data, scheduling meetings, etc. In addition, a person often has to switch back and forth from handing personal items to work-related tasks. Conventionally, there are a number of different tools for managing work/personal life such as work and personal calendars, work-related task systems, social media, tasks lists, etc. However, the person usually must log into the various systems, check different applications, check with various different people, view different calendars, and then manually organize which tasks to accomplish and which order to perform the tasks, which may result in missed activities and/or decreased productivity.

SUMMARY

According to a general aspect, a system for personalized planning based on crowd-sourcing includes a data collector configured to collect task-related data specific to a user from multiple different data sources, and a planning optimizer configured to determine a task list providing upcoming tasks to complete based on an analysis of the task-related data in view of role-based task data and task-tracking information. The planning optimizer obtains a task from other users having a same role as the user based on the role-based task data, determines a suggested activity for completing the task based on the task-tracking information, and provides the task list to the user via a user interface.

The system may include one or more of the following features (or any combination thereof). The task-related data may include tasks, activities, and scheduled meetings. The multiple different data sources may include work-specific systems and personal calendars and email accounts such that the data collector combines personal and work-related activities of the user. The system may include a task tracker configured to collect the task-tracking information from the user and other users, a task alerting unit configured to transmit an alert for a potential task to be completed when a key performance indicator (KPI) of an area of responsibility associated with the user or the user's role has exceeded a threshold value, and/or a task prioritizer configured to prioritize the upcoming tasks based on priority information. The planning optimizer may provide a calendar scheduling at least some of the upcoming tasks, and/or provide a recommendation for completing the task based on a social network of the user. The system may include a task selector configured to receive a selection of the task from the task list and invoke an external system for completing the task.

According to a general aspect, a computer program product tangibly embodied on a non-transitory computer-readable storage medium and including executable code that, when executed, is configured to cause at least one processor to collect task-related data specific to a user from multiple different data sources, determine a task list providing upcoming tasks to complete based on an analysis of the task-related data in view of role-based task data and task-tracking information, obtain a task from other users having a same role as the user based on the role-based task data, determine a suggested activity for completing the task based on the task-tracking information, and provide the task list to the user via a user interface.

The computer program product may include one or more of the following features (or any combination thereof). The task-related data may include tasks, activities, and scheduled meetings. The multiple different data sources may include work-specific systems and personal calendars and email accounts such that personal and work-related activities of the user are combined. The executable code that, when executed, is configured to cause the at least one processor to collect the task-tracking information from the user and other users, transmit an alert for a potential task to be completed when a key performance indicator (KPI) of an area of responsibility associated with the user or the user's role has exceeded a threshold value, prioritize the upcoming tasks based on priority information, provide a calendar scheduling at least some of the upcoming tasks, and/or provide a recommendation for completing the task based on a social network of the user.

According to a general aspect, a method for personalized planning based on crowd-sourcing includes collecting task-related data specific to a user from multiple different data sources, determining a task list providing upcoming tasks to complete based on an analysis of the task-related data in view of role-based task data and task-tracking information, obtaining a task from other users having a same role as the user based on the role-based task data, determining a suggested activity for completing the task based on the task-tracking information, and providing the task list to the user via a user interface.

The method may include one or more of the following features (or any combination thereof). The task-related data may include tasks, activities, and scheduled meetings. The multiple different data sources may include work-specific systems and personal calendars and email accounts such that personal and work-related activities of the user are combined.

The details of one or more implementations are set forth in the accompanying drawings and the description below. Other features will be apparent from the description and drawings, and from the claims.

DETAILED DESCRIPTION

Instead of manually planning tasks, the embodiments provide a system that supports users in planning their daily work and personal tasks based on self-optimizing role-based crowed-sourced information (e.g., what the user and other users have done in similar situations or roles, and the time it took to complete them), thereby resulting in smarter decisions in terms of planning and predicting upcoming tasks and alerting the user before issues arise. The system may operate as a central entry point that collects task-related data of the user from any connected system (e.g., email, work calendar, personal calendar, social media, work-specific systems for managing tasks, etc.) and analyzes the user's task-related data in view of other task-related data of other users having the same role to determine a task list for upcoming tasks to complete on a daily, weekly, or monthly basis. Furthermore, the system incorporates an alerting mechanism that transmits alerts to the user upon meeting certain criteria such that the user can react to issues before they occur.

Because the system obtains the role of the user, the system may propose typical tasks to be complete based on the role. For example, if the user is a manager of a financial department, the system can propose typical tasks that are handled by the financial department's manager. Further, the proposed tasks and timing of these tasks are determined with crowd-sourced data that includes information on how other users solved particular tasks. For example, the system may track and collect the steps and timing on how the user completed their tasks such as which steps they performed to accomplish the tasks, how long the task or individual steps took to complete the task, and/or what tasks need to be completed at certain times of the month, etc. Over time, the accuracy of the crowed-sourced data may improve as the system receives more and more feedback from the end users. As a result, the system may learn which actions to perform to solve the task in an optimized manner.

Furthermore, by comparing the user's task data with task data of other users having the same role, the system may propose tasks that are highly correlated with the user's role in a manner that provides the user with information on how to complete the task and how long the task typically takes to complete, thereby speeding up the learning curve by showing him/her what others are doing in the same role at a given point in time or situation. In addition, the system allows the user to directly invoke the relevant business system to complete a selected task, thereby creating a system that not only provides reporting, but also a more complete solution for structuring and completing all user's tasks. These and other features of the embodiments are further discussed with reference to the figures.

Figure 1:
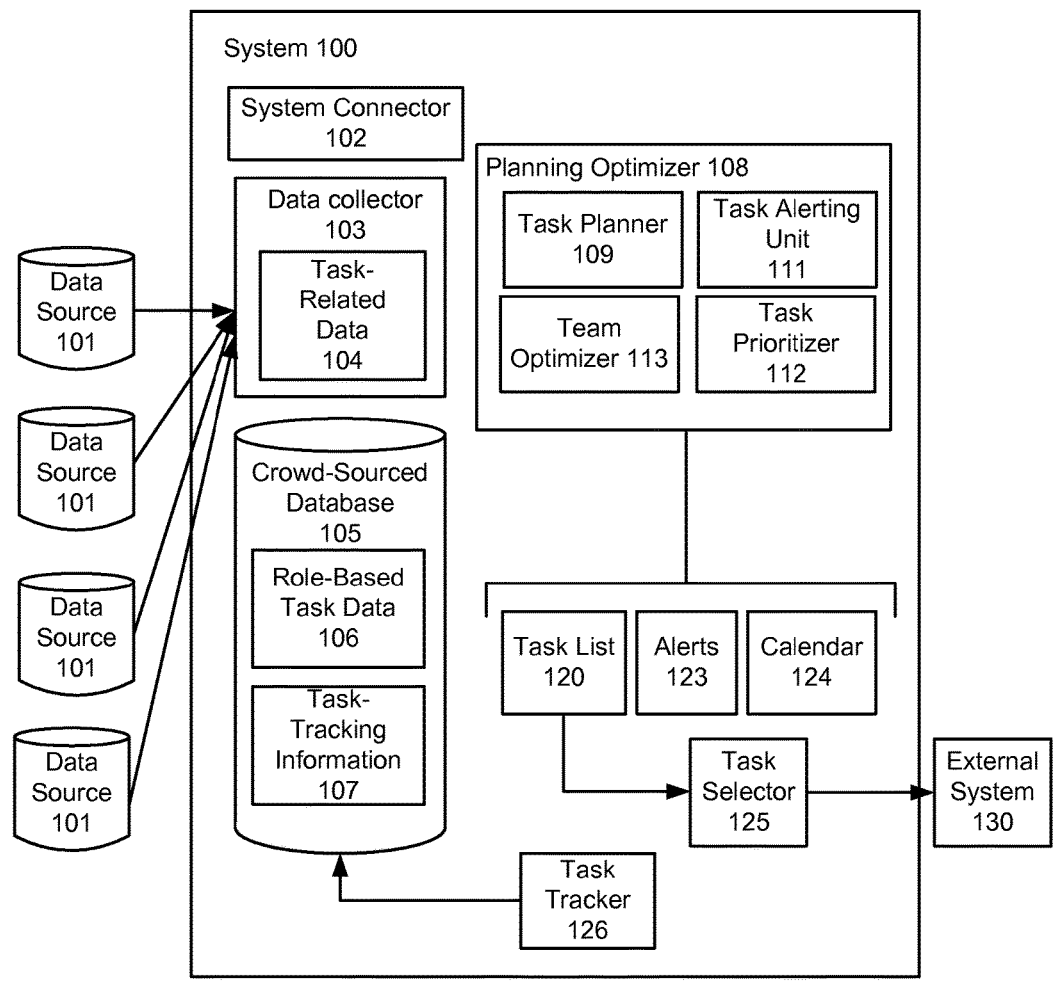
FIG. 1 illustrates a system for personalized planning, predicting, and alerting based on self-optimizing role-based crowd-sourced information.

FIG. 1 illustrates a system 100 for personalized planning, predicting, and alerting based on crowd-sourced database 105 storing self-optimizing role-based crowd-sourced information. The crowd-sourced database 105 may include role-based task data 106 providing typical tasks according to various roles. In some examples, the role-based task data 106 may include any system-defined tasks according to various roles within an organization that can be set up via the role description, the user itself, schedules attached the roles, and alerts based on defined threshold for areas of responsibility. The crowd-sourced database 105 may include task-tracking information 107 providing user-collected data about typical behaviors on completing the tasks across any number of users. For example, each user can submit feedback to the system 100 that provides information on how they solved a task, how long each task took to be completed, and/or what they typically do at a certain point in time, and this information is stored as the task-tracking information 107.

The system 100 includes a task tracker 126 configured to collect the task-tracking information 107 as the user and other users complete their tasks. The task-tracking information 107 may specify a description of the task, the steps required to complete the task, task duration on the amount of time required to complete the tasks or individual steps to complete task. The task tracker 126 is configured to collect the task-tracking information 107, and store the task-tracking information 107 in the crowd-sourced database 105.

The system 100 includes a system connector 102 configured to connect one or more data sources 101, a data collector 103 configured to collect task-related data 104 specific to a user from the data sources 101, and a planning optimizer 108 configured to analyze the user's task-related data 104 in view of the crowd-sourced database 105 to determine a task list 120 of upcoming tasks, one or more alerts 123 to notify the user of an upcoming issue, and/or a calendar 124 providing a calendar view of events or tasks.

The user may define which data sources 101 should be connected to the system 100. For example, if the user do not wish to have his/her personal information connected to the system 100, the user would not link his/her personal accounts. Generally, the data sources 101 may include any number of types of sources capable of storing task-related data 104 of the user. The data sources 101 may include multiple business systems and information sources. In some examples, the data sources 101 include one or more types of email accounts, work calendars, personal calendars, social media accounts, and/or one or more work-specific systems for managing projects, responsibilities, tasks, and meetings. The work-specific systems may widely vary depending on the type of organization. In one specific example, a salesperson may have to log into a customer relationship management system to determine which tasks to complete, e.g., follow up with various leads, contact clients after shipment of goods, etc. Furthermore, one of the data sources 101 may specify the role of the user within the organization (e.g., manager, engineer, etc.). In addition, the work-specific systems may provide process descriptions for typical business processes, thresholds, enterprise resource planning (ERP), transactions, and/or identify one or more key performance indicators (KPIs) that relate to performance metrics on certain areas of the user's responsibility. For example, the work-specific system may track various KPIs for the user, and if the KPIs reach a certain threshold, the user may be alerted to perform a task.

The system connector 102 may receive information from the user on which data sources 101 to connect to the system 100. For example, the user may wish to link multiple business systems and information sources to the system 100. In some examples, the data sources 101 may include work-based data sources and private data sources. For example, the system 100 can combine the personal and business activities of the user to allow the user to switch back and forth during a flexible day. As such, the system 100 provides more of a holistic view that accounts for the user's work and personal daily life. In some examples, the user may wish to link his/her personal email account, work email account, a work-specific system, personal calendar, and work calendar, and/or one or more social media accounts.

The data collector 103 may collect the task-related data 104 of the user from any connected data sources 101. For example, the data collector 103 collects the user-specific task-related data 104 across multiple data sources 101. As such, unlike conventional methods, the system 100 provides unified access to the user's activities across multiple connected business systems and information sources. In some examples, the data collector 103 may access all user-specific task-related data 104 that can be used for predictions, planning, and alerting. In some examples, the data collector 103 may pull information from any connected data source 101, combining information about current appointments and action items, but also unread messages, action items for meetings, upcoming activities from projects or tasks within their job role or their private life. The collected task-related data 104 is not only based on user-based information (e.g., calendar), but also reads information from attached business systems to allow predictions of upcoming tasks and a reliable alerting infrastructure allowing users to react to issues before they even occur. Furthermore, the user benefits from having to access one system instead of accessing multiple sources and then manually determining which tasks to accomplish, which may result in missed activities or tasks.

The task-related data 104 may include any type of information that specifies tasks, activities, appointments, meeting events, transactions, duties, responsibilities, or other information that indicates a certain action to be performed by the user (e.g., work on a project, attend a meeting, buy a birthday present, review a report, hire a person, etc.). In some examples, the user-specific task-related data 104 may include calendar event information (e.g., description, time, date, duration, location, tasks to complete before event, action items from the event, etc.) from the personal and/or work calendars, email information such as number of unread emails, total number of emails, identification of emails identified as important or urgent, emails from a certain person or system, and tasks associated with the personal/ work email accounts, work-related tasks, action items, transactions, process descriptions attached to the user, thresholds attached to the user, projects from any work-specific system, and/or social gathering events (e.g., birthday, wedding, anniversary, etc.) from social media sites. In addition, the user-specific task-related data 104 may include any KPIs associated derived from any connected data source 101.

In addition, the user-specific task-related data 104 may include user-specific human resource data such as a user identifier, department, role, and/or authorizations associated with the user. In some examples, the user may be associated with an employee identifier, and the user may be classified within a certain department of the organization such as accounting, finance, budget, management, engineering, and legal, for example. The role is more generic than the user's identifier in the sense that multiple people have the same role. In some examples, the role is the part that the user has within the organization. The role may widely vary, but some examples include sales manager, sales representative, manager, engineer, etc. In some examples, the role may be based on the user's title or description. The authorizations may include access rights to resources. For example, the access rights may specify which data the user is authorized to view and/or modified.

The planning optimizer 108 may receive the collected task-related data 104 specific to the user, and analyze the task-related data 104 in view of the crowd-source database 105 to determine the task list 120, the alerts 123, and the calendar 124. In some examples, the planning optimizer 108 obtains the role of the user, and then pulls system-defined tasks from the role-based task data 106 to compare to the task-related data 104 to determine the task list 120. Also, the planning optimizer 108 may analyze the task-tracking information 107 to determine which activities are more effective for a certain issue. For example, the planning optimizer 108 may determine a task for working on the quarterly report based on the role-based task data 106 (e.g., the role-based task data 106 identifies this task as pertaining to the user's role). Then, the planning optimizer 108 may look to the task-tracking information 107 to examine other user's activities in performing this task (e.g., the other users can be users with the same role or users having a different role but perform the same task). The planning optimizer 108 may determine that certain activities were more effective for creating the quarterly report because they had shorter task durations or less complicated.

The planning optimizer 108 may include a task planner 109 configured to determine the task list 120 based on the user's task-related data 104 in view of the role-based task data 106 and the task-tracking information 107. The role-based task data 106 may specify one or more tasks that are typically carried out with respect to various roles of the user. Also, the role-based task data 106 may indicate priorities of tasks, e.g., which tasks have a higher priority than other tasks. In some examples, the role-based task data 106 may include one or more KPIs that are associated with various roles. The task planner 109 may determine the role of the user from the user's task-related data 104, and then search the role-based task data 106 for tasks specific to the determined role.

The task-tracking information 107 may store a description of the task, the activities required to complete the task, task duration on the amount of time required to complete the tasks or individual steps to complete task. The task tracker 126 is configured to collect the task-tracking information 107, and store the task-tracking information 107 in the crowd-sourced database 105. The task-tracking information 107 is shared with other users having the same role or scheduled to perform the same task. Therefore, the task planner 109 may determine a schedule of tasks based on the user and other user's information on the necessary activities to complete the tasks, how long the tasks took to complete, as well as the type of typically tasks performed by users having the same role.

The planning optimizer 108 may provide the task list 120 to the user via a user interface. According to the embodiments, the user may select a task from the task list 120 to complete. In response to receipt of the task selection, the task selector 125 may automatically invoke an external system 130 for completing the task. The external system 130 may be any one of the connected data sources 101. In particular, the external system 130 may be a business system that interfaces with the user for the completion of tasks. Instead of separating logging into the external system 130, upon selection of a task from the task list 120, the task selector 125 may directly invoke the relevant business system to complete the task.

In one example, if the user has responsibility of a cost center and the budget consumption reaches a certain limit, the task planner 109 may automatically create a task to show this alert. For example, the budget consumption reaching a certain limit may be referred to a KPI. This KPI may be received from the user's task-related data 104 collected from one of the data sources 101, or obtained from the role-based task data 106 associated the same role as the user. Upon reviewing this task from the task list 120, the user in conjunction with the task selector 125 may directly invoke the needed transactions, analyze the situation and will be guided via proposed steps what others in the same role did in such a situation. In another example, the task planner 109 may determine that the user has a specific appointment with a person in his calendar. The task planner 109 may derive which tasks are typically done to prepare for this appointment and schedule those tasks accordingly in the future to create an optimized schedule. For example, the task planner 109 may derive these tasks based on the end user's behavior or via others in the same role.

In another example, if the user allows access to private data, the task planner 109 may propose a task to purchase a birthday present before the birthday or birthday event. For example, the task planner 109 may determine an event related to a birthday party (e.g., invitation to a birthday party), and schedule a task to buy a birthday present. In some examples, the task planner 109 may analyze data from social networks to suggest a kind of birthday present (e.g., interests of connected friends taken from previous posts or status updates as well as on the experience and behavior of others based on the given data and situation).

The planning optimizer 108 may include a task alerting unit 111 configured to transmit an alert 123 for a potential task to be completed when a KPI of an area of responsibility associated with the user or the user's role has exceeded a threshold value. For example, the task alerting unit 111 may send an email, text, or display the alert 123 on the user interface. In some examples, the task alerting unit 111 determines the relevant KPIs from the user's task-related data 104 or other user's having the same role from the role-based task data 106. If one or more of the KPIs are above a certain threshold, the task alerting unit 111 may be configured to transmit one or more of the alerts 123 to the user.

Also, in conjunction with the task alerting unit 111, the task planner 109 may predict one or more tasks based on the KPIs. For example, as the system 100 has access to all business data that the user also has access to, the task planner 109 may predict if a new task needs to be created to show him/her an alert 123, and propose next steps to solve this issue, based on the defined KPIs and the information from the task-tracking information 107 and/or the role-based task data 106. As such, the user can focus on one system to plan their work day, instead of relaying on multiple different systems, which are not connected to each other. Also, the task planner 109 may automatically create a new task and send an alert 123 before an issue materializes.

The planning optimizer 108 may include a task prioritizer 112 configured to prioritize the upcoming tasks based on priority information provided by the user via the task-related data 104 or users having the same role as provided by the role-based task data 106. The priority information may indicate which tasks have priority over other tasks. In some examples, the tasks are capable of being annotated with a priority (e.g., low, medium, high). As such, the task prioritizer 112 may be configured to schedule the upcoming tasks according to their priority.

The planning optimizer 108 may include a team optimizer 113 configured to access the performance of a team or group of people in view of certain performance goals, and then dynamically adjust the workload balance by arranging the tasks of its team members. For example, for managers, the team optimizer 113 may predict the team's situation and may assist the manager based on experience from the task-tracking information 107 to optimize the workload before the team gets overloaded. In some examples, the team optimizer 113 may obtain one or more tasks to be completed and adjust the deadline for the tasks or automatically switching tasks to different team members.

Figure 2:
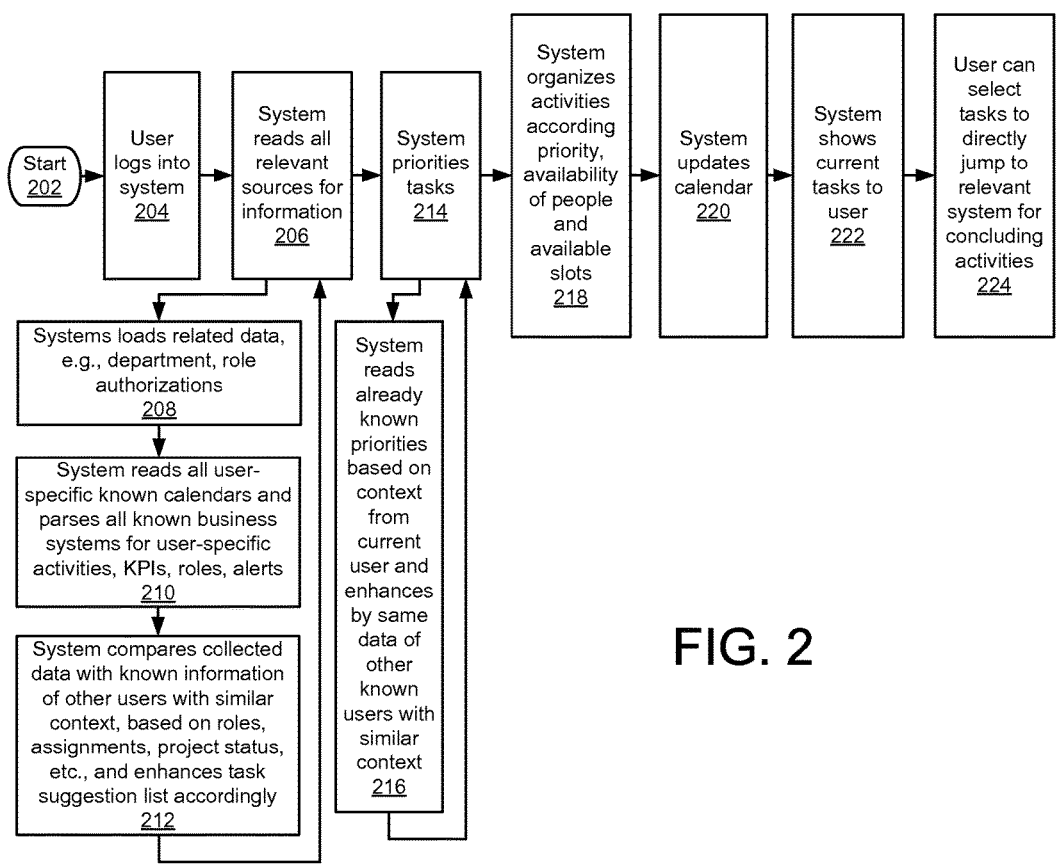
FIG. 2 is a flowchart illustrating example operations of the system of FIG. 1.

FIG. 2 is a flowchart illustrating example operations of the system 100 of FIG. 1 according to an aspect. Although FIG. 2 is illustrated as a sequential, ordered listing of operations, it will be appreciated that some or all of the operations may occur in a different order, or in parallel, or iteratively, or may overlap in time.

After the process starts (202), the user logs into the system (204). For example, the user may supply his/her login and password to log-into the system 100. Then, the system reads all relevant sources from information (206). For example, the data collector 103 may collect task-related data 104 of the user from any connected data source 101. For example, the system load related data, e.g., department, role, authorizations. The data collector 103 may obtain human resource-related data from one of the connected data sources 101 in order to determine the role of the user, as well as his/her department and authorizations for viewing/modifying data from one or more of the data sources 101. The system reads all user-specific known calendars and parses all known business systems for user-specific activities, KPIs, roles, and alerts (210). For example, the data collector 103 may obtain any private and public calendars, and parses the work-related system for any relevant KPIs or user-specific activities or tasks.

The system compares collected data with known information of other uses with similar context, based on roles, assignments, project status, etc., and enhances task suggestion list accordingly (212). For example, the planning optimizer 108 compares the collected task-related data 104 in view of task-related data from other users having the same roles, assignments, project status, etc. to obtain the task list 120. Then, the system prioritizes the tasks (214). For example, the task prioritizer 112 may prioritize the tasks within the task list 120. In particular, the system reads already known priorities based on context from the current user and enhances by same data of other known user with similar context (216). For example, the task prioritizer 112 may obtain priority information from the role-based task data 106 and the task-tracking information 107, as well as any type of priorities provided by the user, and determines the priority of tasks based on the obtained priority information. The system organizes activities according to priority, availability of people and available slots (218). For example, the task planner 109 may organize the tasks according to the obtained priority, as well as the available of people to perform the tasks and the available time slots for accomplishing the tasks.

The system updates the calendar (220). For example, the planning optimizer 108 may be configured to provide the calendar 124 such that the calendar 124 is populated with tasks determined from the planning optimizer 108. The system shows the current tasks to the user (222). For example, the planning optimizer 108 may provide the task list 120 via the user interface. The user can select task to directly jump to relevant system for concluding activities (226). For example, the task selector 125 may receive a task selection indicating that the user selected one of the tasks provided on the task list 120, and the task selector 125 may automatically invoke an external system 130 for completing the task.

Figure 3:
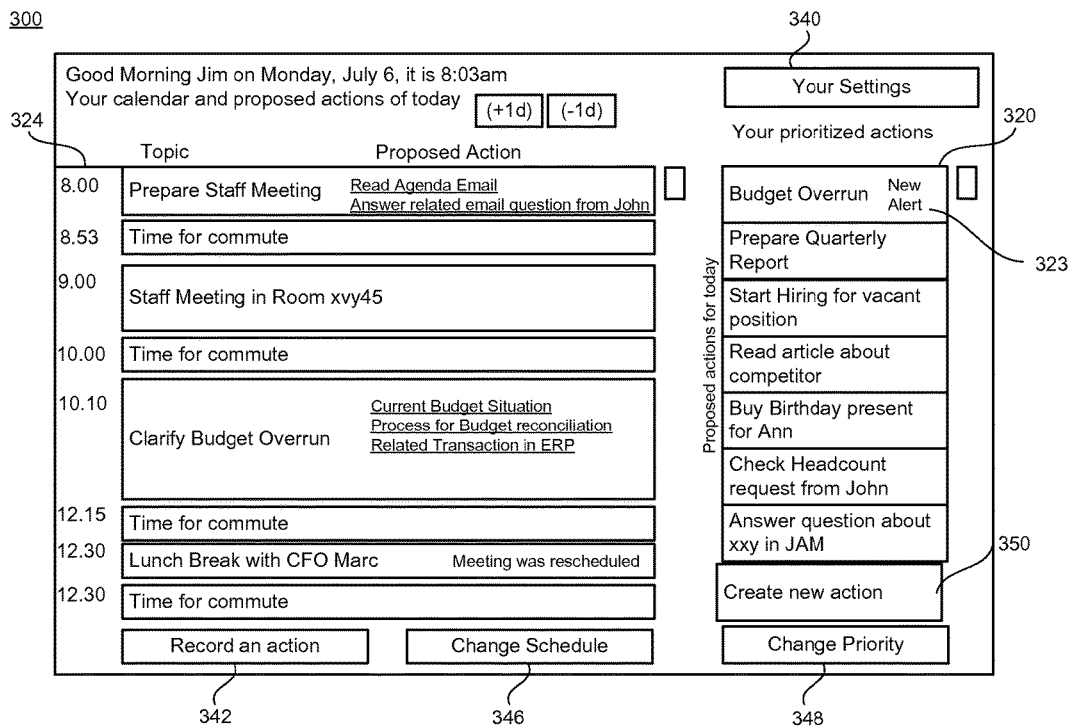
FIG. 3 illustrates an example of a user interface of the system of FIG. 1.

FIG. 3 illustrates an example of a user interface 300 of the system 100 of FIG. 1 according to an aspect. For example, the user interface 300 provides a calendar 324 arranging events along with proposed actions, and a task list 320 providing a list of prioritized actions including an alert 323. As shown in FIG. 3, the task list 320 combines personal and work related actions from a variety of systems, e.g., KPIs regarding a department area (budget), reoccurring tasks (e.g., quarterly report is generated towards the end of the quarter) from work-specific system, a personal task (buy birthday present) from personal calendar/task list, etc.

In addition, the user interface 300 includes a number of selectable user interface elements 342 (record an action), 346 (change schedule), 340 (your settings), 348 (change actions priority), and 350 (create new action). For example, upon selection of user interface element 342, the system 100 may provide another object to receive information for recording an action related to one of the calendar events. In particular, the user may have attended the staff meeting at 9 am, which resulted in an action item, and this action item may be entered into the system 100 by selecting the user interface element 342. Also, upon selection of the user interface element 346, the system 100 may provide another object that allows the user to change the calendar's schedule, e.g., add/delete/modify calendar events. Upon selection of user interface element 340, the system 100 may provide another object displaying the user's settings such as personal and/or account settings like account info, working hours, deputies for vacation, etc. Upon selection of user interface element 348, the system 100 may provide another object that allows the user to change the priority settings of the actions. For example, the user may be permitted to change the priority of a task or a group of tasks to a higher or lower priority. Upon selection of user interface element 350, the system 100 may provide another object to allow the user to add/delete/modify actions from the task list 320.

Figure 4:
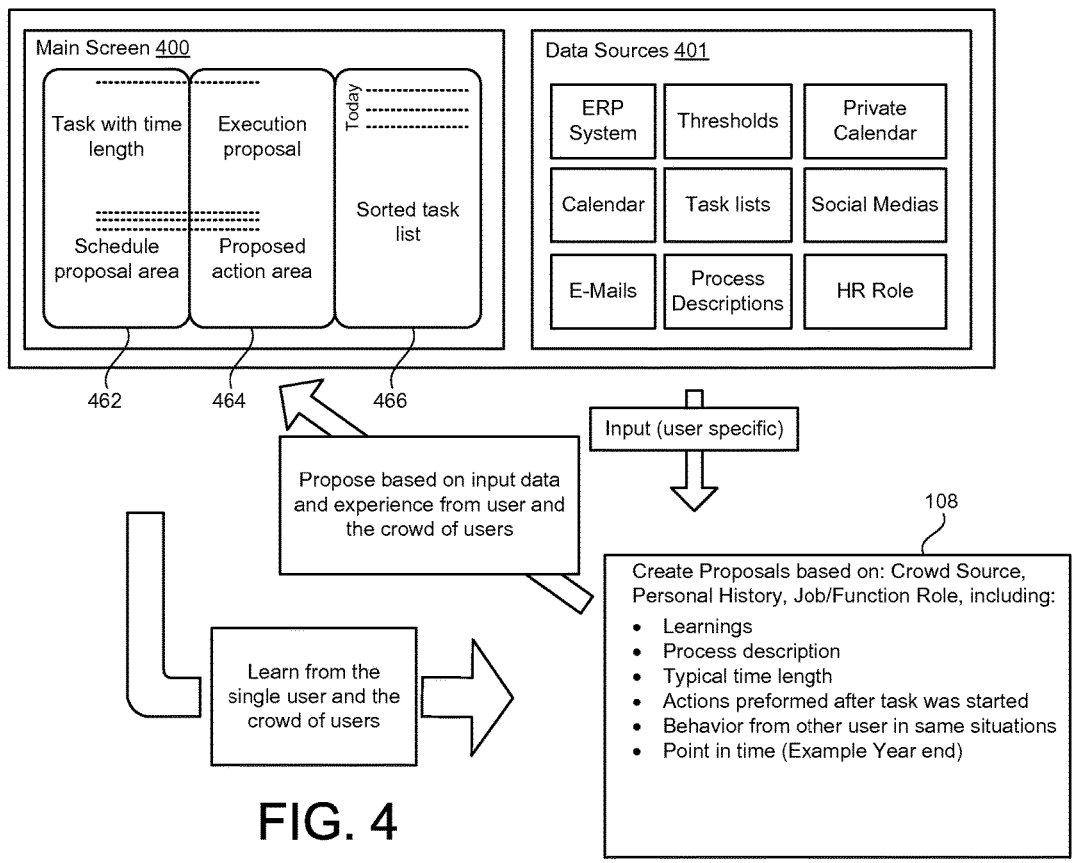
FIG. 4 illustrates the inputs and outputs of the planning optimizer of the system of FIG. 1.

FIG. 4 illustrates the inputs and outputs of the planning optimizer 108 according to an aspect. For example, FIG. 4 illustrates a main screen 400 depicting a schedule proposal area 462 with tasks having time lengths, proposed action area 464 providing execution proposals (e.g., link to various data sources), and a task list area 466 providing a sorted task list with the possibility for manually reprioritizations and adjustments. Also, FIG. 4 illustrates various types of data sources 401 that can be connected (e.g., ERP system, calendar, emails, thresholds, task lists, process descriptions, private calendar, social medias, and process descriptions).

As shown in FIG. 4, the planning optimizer 108 may receive user-specific input from any of the connected data sources 401 and information learned from the single user and the crowd of users having the same role as the user, and create proposals (e.g., schedules, tasks lists, etc.) based on crowd-source learning, personal history of the user, and job function or role. In some examples, this information may include the crowd-source learning, the process descriptions, the typical time lengths for completing actions, actions performed after the task was started, behaviour from other users in the same situations, and tasks for different points in time (e.g., end of year or end of quarter), etc.

Figure 5:
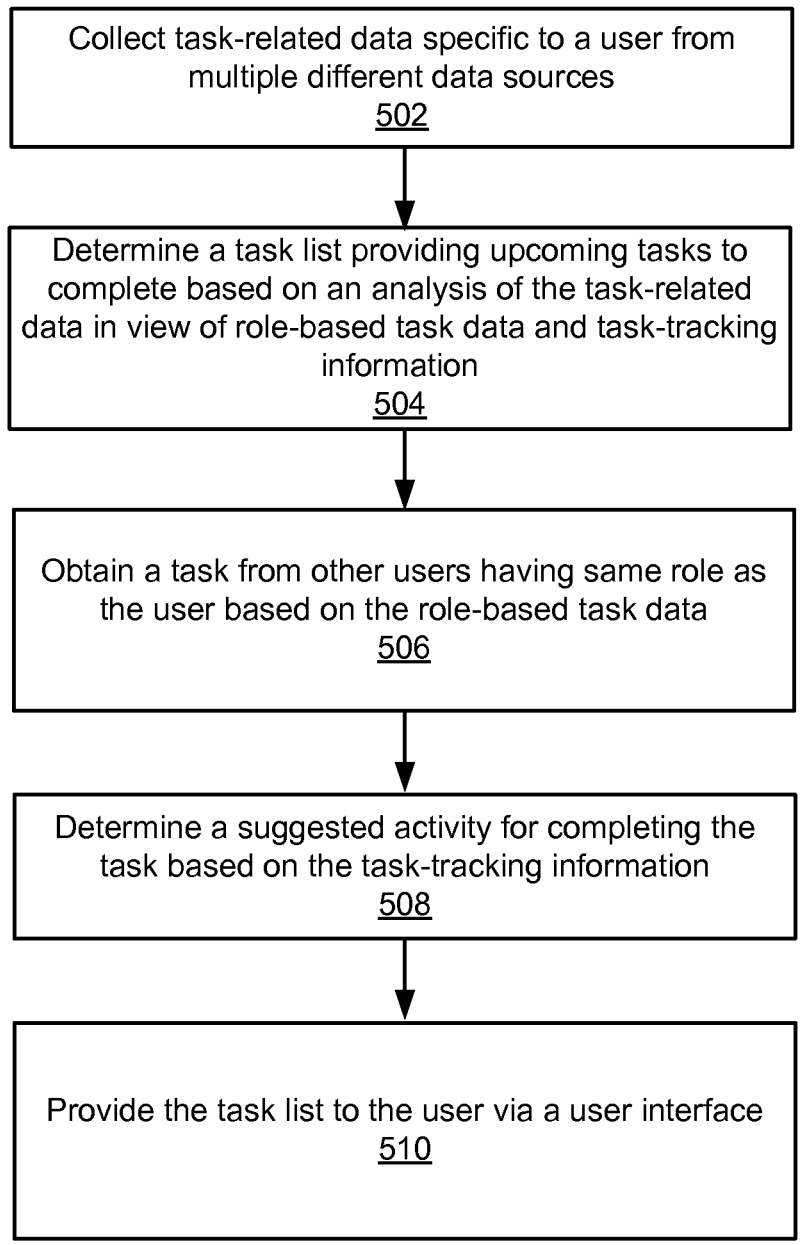
FIG. 5 is a flowchart illustrating example operations of the system of FIG. 1.

FIG. 5 is a flowchart illustrating example operations of the system 100 of FIG. 1 according to an aspect. Although FIG. 5 is illustrated as a sequential, ordered listing of operations, it will be appreciated that some or all of the operations may occur in a different order, or in parallel, or iteratively, or may overlap in time.

Task-related data specific to a user may be collected from multiple different data sources (502). For example, the data collector 103 is configured to collect the task-related data 104 from the data sources 101. The data collector 103 is configured to provide unified access to the user's activities across multiple connected business systems and information sources. In some examples, the data collector 103 may pull information from any connected data source 101, combining information about current appointments and action items, but also unread messages, action items for meetings, upcoming activities from projects or tasks within their job role or their private life.

A task list providing upcoming tasks to complete may be determined based on an analysis of the task-related data in view of role-based task data and task-tracking information (504). The planning optimizer 108 may receive the collected task-related data 104 specific to the user, and analyze the task-related data 104 in view of the crowd-source database 105 to determine the task list 120. The crowd-sourced database 105 may include the role-based task data 106 providing typical tasks according to various roles. The role-based task data 106 may include any system-defined tasks according to various roles within an organization that can be set up via the role description, the user itself, schedules attached the roles, and alerts based on defined threshold for areas of responsibility. The crowd-sourced database 105 may include the task-tracking information 107 providing user-collected data about typical behaviors on completing the tasks across any number of users. For example, each user can submit feedback to the system 100 that provides information on how they solved a task, how long each task took to be completed, and/or what they typically do at a certain point in time, and this information is stored as the task-tracking information 107.

A task from other users having same role as the user may be obtained based on the role-based task data (506). For example, based on the role-based task data 106, the task planner 109 is configured to obtain a task from other users having the same role as the user. For instance, the task planner 109 determines the role of the user, and searches the role-based task data for tasks typically handled within this role. The task planner 109 compares this information with the user-specific task-related data 104 to determine one or more tasks that would be effective to add to the task list 120.

A suggested activity for completing the task may be determined based on the task-tracking information (508). For example, based on the task-tracking information 107, the task planner 109 is configured to suggest an activity for completing the task. The suggested activity may be an activity performed by other users, which have been recorded within the task-tracking information.

The task list may be provided to the user via a user interface (510). For example, the planning optimizer 108 is configured to provide the task list 120 via the user interface. In some examples, the planning optimizer 108 is configured to provide the user interface 300 of FIG. 3 depicting the task list 320 and/or the calendar 324.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for personalized planning based on crowd-sourcing, the system comprising:
   at least one processor;
   a non-transitory computer-readable medium configured to store executable instructions that when executed by the at least one processor are configured to implement:
   a crowd-sourced database configured to store self-optimizing crowd-sourced information, the self-optimizing crowd-sourced information including role-based task data and task-tracking information;
   a data collector configured to collect task-related data specific to a user from a plurality of connected data sources including personal data sources and work-specific data sources;
   a planning optimizer configured to determine a task list providing upcoming tasks to complete based on an analysis of the task-related data in view of the role-based task data and the task-tracking information, the planning optimizer configured to obtain a task from other users having a same role as the user based on the role-based task data, the planning optimizer configured to determine a suggested activity for completing the task based on the task-tracking information, the planning optimizer configured to provide the task list to the user via a user interface; and
   a task selector configured to invoke an external system for completing the task in response to a selection of the task from the task list, the external system being one of the plurality of connected data sources.

2. The system of claim 1, wherein the task-related data includes tasks, activities, and scheduled meetings.

3. The system of claim 1, wherein the data collector is configured to combine personal and work-related activities of the user including combining information about appointments, unread messages, action items for meetings, and upcoming activities from tasks within the role of the user.

4. The system of claim 1, further comprising:
   a task tracker configured to collect the task-tracking information from other users having the same role as the user, the task-tracking information including a description of one or more tasks, one or more activities required to complete the one or more tasks, and task duration specifying an amount of time required to complete the one or more tasks.

5. The system of claim 1, further comprising:
   a task alerting unit configured to transmit an alert for a potential task to be completed when a key performance indicator (KPI) of an area of responsibility associated with the user or the user's role has exceeded a threshold value.

6. The system of claim 1, further comprising:
   a task prioritizer configured to prioritize the upcoming tasks based on priority information provided by the user from the task-related data or users having the same role as the user from the role-based task data.

7. The system of claim 1, wherein the planning optimizer is configured to provide a calendar scheduling at least some of the upcoming tasks.

8. The system of claim 1, wherein one of the plurality of connected data sources is a social media network of the user, and the planning optimizer is configured to provide a recommendation for completing the task based on information from the social media network of the user.

9. The system of claim 1,
   wherein the planning optimizer is configured to determine the suggested activity for completing the task by analyzing activities of other users, and selecting a particular activity having a shorter task duration for completing the task.

10. The system of claim 1, wherein, in response to the selection of the task from the task list, the task selector configured to directly invoke the external system for completing the task without the user separately logging into the external system.

11. A computer program product tangibly embodied on a non-transitory computer-readable storage medium and including executable code that, when executed, is configured to cause at least one processor to:
    store self-optimizing crowd-source information, the self-optimizing crowd-sourced information including role-based task data and task-tracking information;

collect task-related data specific to a user from a plurality of connected data sources including personal data sources and work-specific data sources;

determine a task list providing upcoming tasks to complete based on an analysis of the task-related data in view of the role-based task data and the task-tracking information;

obtain a task from other users having a same role as the user based on the role-based task data;

determine a suggested activity for completing the task based on the task-tracking information;

provide the task list to the user via a user interface; and directly invoke an external system for completing the task in response to a selection of the task from the task list without the user separately logging into the external system, the external system being one of the plurality of connected data sources.

12. The computer program product of claim 11, wherein the task-related data includes tasks, activities, and scheduled meetings.

13. The computer program product of claim 11, wherein the executable code that, when executed, is configured to cause the at least one processor to combine personal and work-related activities of the user including combining information about appointment, unread messages, action items for meetings, and upcoming activities from tasks within the role of the user.

14. The computer program product of claim 11, wherein the executable code that, when executed, is configured to cause the at least one processor to:

collect the task-tracking information from other users having the same role as the user, the task-tracking information including a description of one or more tasks, one or more activities required to complete the one or more tasks, and task duration specifying an amount of time required to complete the one or more tasks.

15. The computer program product of claim 11, wherein the executable code that, when executed, is configured to cause the at least one processor to:

transmit an alert for a potential task to be completed when a key performance indicator (KPI) of an area of responsibility associated with the user or the user's role has exceeded a threshold value.

16. The computer program product of claim 11, wherein the executable code that, when executed, is configured to cause the at least one processor to:

prioritize the upcoming tasks based on priority information provided by the user from the task-related data or users having the same role as the user from the role-based task data.

17. The computer program product of claim 11, wherein the executable code that, when executed, is configured to cause the at least one processor to:

provide a calendar scheduling at least some of the upcoming tasks.

18. The computer program product of claim 11, wherein one of the plurality of connected data sources is a social media network of the user, and the executable code that, when executed, is configured to cause the at least one processor to:

provide a recommendation for completing the task based on information from the social media network of the user.

19. A method for personalized planning based on crowd-sourcing, the method comprising:

storing, by at least one processor, self-optimizing crowd-source information, the self-optimizing crowd-sourced information including role-based task data and task-tracking information;

linking, by the at least one processor, a plurality of data sources based on information received from a user, the plurality of linked data sources including personal data sources and work-specific data sources;

collecting, by the at least one processor, task-related data specific to the user from the plurality of linked data sources;

determining, by the at least one processor, a task list providing upcoming tasks to complete based on an analysis of the task-related data in view of the role-based task data and the task-tracking information;

obtaining, by the at least one processor, a task from other users having a same role as the user based on the role-based task data;

determining, by the at least one processor, a suggested activity for completing the task based on the task-tracking information;

providing, by the at least one processor, the task list to the user via a user interface; and directly, by the at least one processor, invoking an external system for completing the task in response to a selection of the task from the task list without the user separately logging into the external system, the external system being one of the plurality of linked data sources.

20. The method of claim 19, wherein the task-related data includes tasks, activities, and scheduled meetings.

* * * * *